Patented May 22, 1945

2,376,508

UNITED STATES PATENT OFFICE 2,376,508

CATALYSIS

Alexander N. Sachanen and Philip D. Caesar, Woodbury, N. J., assignors to Socony-Vacuum Oil Company, Incorporated, New York, N. Y., a corporation of New York No Drawing. Application August 30, 1941, Serial No. 408,995

7 Claims. (Cl. 260—683.4)

This invention relates to catalytic hydrocarbon reactions, and more particularly it has reference to reactions of hydrocarbon materials catalyzed by a catalyst of the class typified by aluminum chloride, said catalyst being activated by a novel class of substances as disclosed hereinafter.

Processes for catalyzing with such materials as aluminum chloride, conversions of hydrocarbons involving alkylation, isomerization, polymerization, cyclization or the like are well known in the art, and the mechanisms of the reactions have been the subject of much discussion. It has been established that superior results are obtained by the use of small amounts of water and/or hydrogen halides, such as hydrochloric acid. The latter substances have been referred to as activators for the catalyst, without the function thereof being understood. These previously used activators have an effect on the catalytic activity of the catalyst, but it is necessary to constantly supply these activators of the prior art in order to obtain what effect they have.

This invention is based upon the discovery that non-volatile or slightly volatile strong acids and acid chlorides in general, when present in substantial amounts, are suitable for the purpose of activating catalysts of the class to which the invention relates, which class is frequently referred to as "catalysts of the Friedel-Crafts type," viz., catalysts utilized in the classical Friedel-Crafts reaction. The halides of aluminum, zinc, iron, zirconium, tin, beryllium, tantalum, and boron are generally suitable for the purposes of the invention and are the more important "catalysts of the Friedel-Crafts type." For the purposes of this discussion, it may be assumed that aluminum chloride is typical of the class, and reference to that prominant member of the group is to be understood as generally applying to all members thereof.

The invention contemplates the provision of an improvement in hydrocarbon reactions involving catalysis by aluminum chloride through the use of a novel and extremely efficient activator for the catalyst. It is an important feature of the invention that, by use of the activator described herein, the contemplated reactions may be carried out at lower temperatures which tend to eliminate side reactions in alkylation processes. We prefer to use the temperatures from 0° C. to 60° C. because these moderate temperatures favor the formation of higher octane number alkylates. In addition to this, our copending patent application Serial No. 404,046 shows that above 60° C. the use of activators is not necessary, the high temperature itself being an activating factor.

The activators which have been found to possess the novel and useful properties contemplated by the invention may be defined as those acid halides and strong acids, both organic and inorganic, which are substantially non-volatile under the conditions under which the reaction is conducted. Typical compounds to be used as activators according to the invention are such organic acids as trichloroacetic; the inorganic acids, sulfuric and chlorosulfonic; and the acid halides, acetyl chloride and sulfonyl chloride.

Example I

The nature of the invention is well-illustrated by the alkylation of isobutane with amylene at 40° C. A bomb was charged with 480 cc. isobutane, 39 grams aluminum chloride (10 per cent by weight of the total charge), and 11 grams trichloracetic acid. One hundred-fifty cc. of amylene were then pumped into the bomb at 40° C. under a pressure of about 71 to 79 pounds per square inch with vigorous stirring of the mass. The total time of reaction was about 1½ hours, at the end of which time the synthetic paraffinic constituents of the reaction mass were separated as yield and evaluated. It was found that a total yield of 230 cc. of stabilized gasoline containing 91 per cent of fractions boiling in the range of aviation gasoline (up to 160° C.) was obtained. The iodine number of the gasoline was zero; specific gravity, 0.670; and octane number (Motor method), 82.4.

One important aspect of this invention lies in the discovery that the proportion of the activator has a material effect. The table set out below presents the results of a series of alkylation runs conducted in accordance with the method of Example 1. The conditions of reaction, with the exception of proportions of activator, were maintained constant. In each run isobutane was alkylated at 50° C. with amylene in the presence of 10 per cent aluminum chloride (based upon weight of total charge) activated with varied amounts of trichloracetic acid for a reaction time of two hours. An excess of isobutane over that required by theory to react with the amylene was used in each case. The percentage yield in each case is calculated on a theroetical yield of 170 per cent nonanes by volume with respect to total amylene charged according to the equation $$C_4H_{10} + C_5H_{10} = C_9H_{20}.$$

The results may be summarized as follows:

| Amt. of $CCl_3CO_2H$ with respect to $AlCl_3$ (percent by weight) | Yield of synthetic products with respect to amylene (percent by volume) | Yield with respect to theoretical |
|---|---|---|
| 5 | 66 | 38.8 |
| 12 | 95 | 55.8 |
| 20 | 136 | 80.0 |
| 28 | 153 | 90.0 |
| 40 | 127 | 74.7 |
| 53 | 123 | 72.4 |

It has been found that best results are obtained by using trichloracetc acid as an activator for aluminum chloride when the activator is present in an amount equal to about 30 per cent of the catalyst. The drop in efficiency at higher concentrations, although much less than the corresponding drop at concentrations below the preferred amount, is very noticeable, as shown by the foregoing table. Other combinations of catalyst and activator within the scope of the invention show similar properties. Similar results are also obtained in other processes comprising hydrocarbon reactions involving the use of catalysts of the class to which this invention relates—such as, for example, isomerization.

In general, the activators of this invention should be present in amounts not substantially less than 10 per cent by weight (based upon catalyst) for best results. It will be at once apparent that reactions involving the use of hydrochloric acid, and other volatile acids, as an activator for catalysts of the class typified by aluminum chloride cannot be conducted in accordance with the present invention without the use of considerably higher pressures than have been heretofore usual in the art. The relatively high concentrations required are not possible except when a pressure in excess of the vapor pressure of the acid, or a pressure sufficient to cause the volatile activator to have a density which makes it possible to maintain at least about 5 per cent of activator in the reaction mixture, is applied. For that reason the preferred class of activators are those which may be referred to as strong acids and acid halides, which are non-volatile at usual operating pressures, i. e., pressures not substantially in excess of about 700 pounds per square inch.

Example II

The present process has also proved very satisfactory in the alkylation of isobutane with ethylene. The alkylate so formed contains as much as 45 per cent of dimethyl butanes, predominantly 2,3,dimethyl butane. In producing that high-grade product the following procedure has been used:

70 grams ethylene were pumped gradually into 320 grams isobutane at 60° C. and 225 pounds pressure in the presence of 44 grams aluminum chloride activated by 13 grams trichloracetic acid. After the removal of excess isobutane, 225 grams alkylate were recovered. The boiling range of 93% of the alkylate was from 27° to 160° C.; specific gravity, 0.655; iodine number, zero; and octane number by the Motor method, about 90.0.

Although the foregoing examples describe the use of aluminum chloride in conjunction with trichloracetic acid, it will be apparent to those skilled in the art that other catalysts of the specified class may be used in lieu thereof with comparable results. It has been found that the other activators described also give results very similar to those reported above. The acid activators of this invention belong to the group commonly referred to as "strong acids." Related compounds, such as weak acids (typified by acetic acid) and anhydrides (as acetic anhydride) do not activate aluminum chloride to a sufficient extent to be of value in the production of synthetic paraffinic hydrocarbons by alkylation. Similarly, polymerization of olefins by aluminum chloride is not enhanced to a very great extent by the use of acetic acid, acetic anhydride or like compounds in the reaction mixture. Although the present activated catalysts are of considerable value in polymerization reactions, it is still possible to cause the alkylation to proceed to the material exclusion of polymerization at the higher temperatures.

Example III

The effect of inorganic acids is well-illustrated by the alkylation of isobutane with ethylene in the presence of 6 per cent aluminum chloride and an amount of sulfuric acid equal to 30 per cent of the weight of catalyst at 28° C. A crude yield equal to 73 per cent of the theoretical was obtained, 95% of which was in the aviation gasoline boiling range, having an octane number of 89 and an iodine number of zero.

It is not to be assumed that the specific examples relating to alkylation of lower molecular weight aliphatics exhaust the field of the invention. Those other hydrocarbon reactions involving the use of a catalyst of the nature of aluminum chloride are also benefited. Alkylation of relatively high molecular weight aliphatic hydrocarbons and aromatic compounds is also improved by utilizing the principles disclosed herein. Further, such reactions as decomposition of heavy branched-chain hydrocarbons to lighter materials are also benefited.

Example IV

For instance, iso-octane was decomposed to the extent of 70 per cent at 35–40° C. for 2¾ hours at atmospheric pressure in the presence of 10 per cent aluminum chloride activated by the same amount of trichloracetic acid. Under the same conditions of temperature, time and pressure, iso-octane is stable in the presence of aluminum chloride activated by hydrochloric acid.

Example V

Isomerization reactions catalyzed with 10% aluminum chloride activated by 30 per cent (based upon catalyst weight) of trichloracetic acid give very good results. Normal butane, treated at 150° C. and 600 lb. pressure for three hours with 10 per cent catalyst, yielded 30 per cent isobutane and 3 per cent isopentane.

Example VI

The process of Example V using 5 per cent of catalyst gave 16.3 per cent isobutane, while the greater portion of the remainder (74 per cent) was found to be normal butane suitable for recycling.

Example VII

Normal pentane treated at 100° C. for 1¾ hours with the catalyst and activator of Example V yielded 40 per cent isobutane and 26 per cent isopentane, indicating the simultaneous effect of isomerization and cracking.

Example VIII

An autoclave provided with a stirrer was charged with 250 grams of normal pentane, 26 grams of aluminum chloride and 8 grams of chlorsulphonic acid. The mixture was reacted at 100° C. for one hour with constant agitation. The product was of the following composition:

|  | Per cent by weight |
|---|---|
| Isobutane | 36 |
| Isopentane | 29 |
| n-Pentane | 16 |

The remainder, including hydrocarbons of the so-called lower layers, including aluminum chloride, were not specifically identified.

We claim:

1. In a process of alkylating paraffin hydrocarbons by reaction thereof with olefins in the presence of a catalyst of the Friedel-Crafts type; the improvement which comprises conducting the reaction in the presence of trichloracetic acid.

2. In a process of alkylating isoparaffins by reaction thereof with olefins in the presence of aluminum chloride; the improvement which comprises conducting the reaction in the presence of at least 10 per cent of trichloracetic acid (based on weight of catalyst).

3. In a process of alkylating isobutane by reaction with amylene in the presence of aluminum chloride, the improvement which comprises conducting the reaction in the presence of trichloracetic acid.

4. In a process of alkylating isobutane by reaction with ethylene in the presence of aluminum chloride; the improvement which comprises conducting the reaction in the presence of trichloracetic acid.

5. In a process of alkylating paraffin hydrocarbons by reaction thereof with olefins in the presence of a catalyst of the Friedel-Crafts type; the improvement which comprises conducting the reaction in the presence of trichloracetic acid, the amount of said acid being about 30 per cent of the amount of said catalyst by weight.

6. In a process of alkylating isobutane by reaction with amylene in the presence of aluminum chloride, the improvement which comprises conducting the reaction in the presence of trichloracetic acid, the amount of said acid being about 30 per cent of the amount of said catalyst by weight.

7. In a process of alkylating isobutane by reaction with ethylene in the presence of aluminum chloride, the improvement which comprises conducting the reaction in the presence of trichloracetic acid, the amount of said acid being about 30 per cent of the amount of said catalyst by weight.

ALEXANDER N. SACHANEN.
PHILIP D. CAESAR.